(12) United States Patent
Tsai (10) Patent No.: US 10,358,844 B2
(45) Date of Patent: Jul. 23, 2019

(54) ANTI-REVERSE SEALING LOCK

(71) Applicant: Wen Ho Tsai, Kaohsiung (TW)

(72) Inventor: Wen Ho Tsai, Kaohsiung (TW)

( * ) Notice: Subject to any disclaimer, the term of this patent is extended or adjusted under 35 U.S.C. 154(b) by 0 days.

(21) Appl. No.: 15/835,857

(22) Filed: Dec. 8, 2017

(65) Prior Publication Data

US 2019/0032375 A1 Jan. 31, 2019

(30) Foreign Application Priority Data

Jul. 27, 2017 (TW) .............................. 106211028 U (51) Int. Cl.
| | |
|---|---|
| *E05B 73/00* | (2006.01) |
| *E05B 83/10* | (2014.01) |
| *E05B 13/00* | (2006.01) |
| *F16B 21/18* | (2006.01) |
| *E05B 39/00* | (2006.01) |
| *E05B 67/36* | (2006.01) |
| *G09F 3/03* | (2006.01) |
| *F16B 41/00* | (2006.01) |
| *B65D 90/00* | (2006.01) |
| *B62D 33/037* | (2006.01) |

(52) U.S. Cl.
CPC ........ *E05B 73/0017* (2013.01); *E05B 13/004* (2013.01); *E05B 39/00* (2013.01); *E05B 67/36* (2013.01); *E05B 83/10* (2013.01); *F16B 21/18* (2013.01); *F16B 41/005* (2013.01); *G09F 3/0317* (2013.01); *B62D 33/037* (2013.01); *B65D 90/008* (2013.01)

(58) Field of Classification Search
CPC .......... E05B 39/00; E05B 39/02; E05B 67/36; E05B 73/00; E05B 73/0017; B65D 27/20; B65D 27/26
See application file for complete search history.

(56) References Cited

U.S. PATENT DOCUMENTS

| | | | | |
|---|---|---|---|---|
| 4,626,009 | A | * 12/1986 | Burnett | ............... F16B 37/0842 |
| | | | | 292/327 |
| 4,802,700 | A | * 2/1989 | Stevenson | ............. F16B 21/078 |
| | | | | 292/327 |
| 4,929,006 | A | * 5/1990 | Tsay | ...................... G09F 3/0352 |
| | | | | 292/319 |
| 5,127,687 | A | * 7/1992 | Guiler | ................... F16B 41/005 |
| | | | | 292/327 |

(Continued)

*Primary Examiner* — Christopher J Boswell
(74) *Attorney, Agent, or Firm* — Rosenberg, Klein & Lee (57) ABSTRACT

An anti-reverse sealing lock includes a transparent housing having a passage with an opening in a top side of the transparent housing. A locking block is mounted in the passage and includes a locking ring and an anti-reverse member mounted in the passage. The locking ring includes a locking ring hole having an inclined groove receiving a C-shaped ring. The anti-reverse member includes a through-hole. A latch rod includes an insertion section having a first stepped groove and a second stepped groove. The latch rod extends through the opening, the locking ring hole, and the through-hole. The C-shaped ring is retained in the first stepped groove. A peripheral edge of the through-hole at an end of the anti-reverse member abuts against an end wall of the second stepped groove when the latch rod moves in a removal direction, preventing removal of the latch rod.

11 Claims, 14 Drawing Sheets

(56) References Cited

U.S. PATENT DOCUMENTS

| | | | |
|---|---|---|---|
| 6,407,666 B1 * | 6/2002 | Debrody | H01R 24/58 340/542 |
| 7,518,521 B2 * | 4/2009 | Feibelman | E05B 73/0017 340/568.2 |
| 7,750,806 B1 * | 7/2010 | Skjellerup | E05B 73/0017 340/5.6 |
| 9,472,125 B2 * | 10/2016 | Debrody | G09F 3/0317 |
| 2016/0146239 A1 * | 5/2016 | Nazzari | E05B 39/00 70/232 |

* cited by examiner

ANTI-REVERSE SEALING LOCK

BACKGROUND OF THE INVENTION

The present invention relates to a sealing lock and, more particularly, to an anti-reverse sealing lock.

A sealing lock is generally used on a door of a cargo container to avoid the goods with an economic value in the cargo container from being stolen or to avoid the goods in the cargo container from being stealthily substituted (which could be substituted by dangerous or prohibited goods, such that the owner of the cargo container may be subject to a judicial inquiry) or maliciously damaged, thereby preventing a loss of property and trade credit of the cargo owner. The sealing lock with a unique sealing mechanism will be destroyed when the sealing lock is opened. Thus, opening of the cargo container can be identified by checking whether the sealing lock is still intact, and appropriate measures can be taken to avoid worse consequences.

Taiwan Utility Model M529735 discloses a visually identifiable see-through sealing lock including a transparent housing having a passage intercommunicated with an opening in a top wall of the transparent housing. A locking body is mounted in a portion of the passage and includes a first locking ring, a first spacer ring, a second locking ring, and a second spacer ring from top to bottom in sequence. The first locking ring includes an annular block abutting against an inner side of the top wall. Each of the first locking ring and the second locking ring includes an inner edge having an inclined groove. A first C-shaped ring and a second C-shaped ring are respectively received in the inclined grooves of the first locking ring and the second locking ring. A latch rod includes an insertion section inserted into a portion of the passage of the transparent housing. The insertion section includes a first stepped groove, a second stepped groove, and a third stepped groove from top to bottom in sequence. When the latch rod is completely inserted into the passage, the first stepped groove and the second stepped groove respectively retain the first C-shaped ring and the second C-shaped ring in place. The second spacer ring serves as a stopper for the third stepped groove in a removal path. The latch rod includes a bottom end having an outer edge that severs as a color displaying section. A gap between two ends of the first C-shaped ring is 1-1.1 times the average cross sectional diameter of an annular body of the first C-shaped ring.

The insertion section includes a colored mark for identifying whether the sealing lock has been substituted, and the latch rod extends through the passage of the transparent housing and the channel of the locking body to provide an anti-reverse mechanism in the channel of the locking body. However, each of the first, second, and third C-shaped rings are apt to be destroyed by a tool or an external force, failing to provide the desired sealing effect.

Thus, a need exists for a novel sealing lock that mitigates and/or obviates the above disadvantages.

BRIEF SUMMARY OF THE INVENTION

An anti-reverse sealing lock according to the present invention includes a transparent housing having a top side and a bottom side spaced from the top side along a longitudinal axis. The transparent housing includes a passage therein. The passage has an opening in the top side. The opening has an inner diameter smaller than an inner diameter of the passage. A locking block is mounted in a section of the passage. The locking block includes a locking ring and an anti-reverse member mounted in the passage. The anti-reverse member is located between the locking ring and the bottom side of the transparent housing along the longitudinal axis. The locking ring includes a locking ring hole having an inclined groove in an end thereof. A C-shaped ring is mounted in the inclined groove. The anti-reverse member includes a through-hole facing the locking ring hole. A latch rod includes an insertion section at an end thereof. The remaining portion of the latch rod is an exposed portion. The insertion section is insertable into the passage of the transparent housing. The insertion section includes a first stepped groove and a second stepped groove. The second stepped groove is located between an end face of the insertion section and the first stepped groove along the longitudinal axis. The latch rod extends through the opening of the transparent housing, the locking ring hole, and the through-hole. The C-shaped ring is retained in the first stepped groove. The anti-reverse member is located between the first stepped groove and the second stepped groove along the longitudinal axis. A peripheral edge of the through-hole at an end of the anti-reverse member forms an anti-reverse mechanism abutting against an end wall of the second stepped groove when the latch rod moves in a removal direction along the longitudinal axis, preventing removal of the latch rod.

In comparison with the prior art using two C-shaped rings performing the anti-reverse mechanisms respectively abutting against associated stepped grooves, one of the C-shaped rings is substituted by the anti-reverse member in the present invention. The substitution is advantageous in that even someone intends to destroy the anti-reverse sealing lock, the anti-reverse member is less easily to be destroyed as a C-shaped ring that can be easily destroyed (into fragments by an external force or by cutting) and then removed.

In an example, a transparent sheath is mounted around the exposed section of the latch rod.

In an example, a transparent jacket is mounted around the transparent housing.

In an example, a pattern or letters are provided on an inner side of the transparent jacket or an outer side of the transparent housing.

In an example, a pattern or letters are provided on an inner side of the transparent sheath or an outer side of the exposed section of the latch rod.

In an example, the transparent housing is a hollow cylinder or a hollow parallelepiped.

In an example, the anti-reverse member includes an annular plate defining the through-hole. A plurality of flexible anti-reverse plates extends from an inner periphery of the through-hole and is spaced from each other in a circumferential direction about the longitudinal axis.

In an example, the anti-reverse member includes a frame defining the through-hole and having a bottom side. A plurality of protrusions protrudes downward from the bottom side of the frame, is spaced from each other in a circumferential direction about the longitudinal axis, and forms the anti-reverse mechanism for abutting against the end wall of the second stepped groove.

In an example, the anti-reverse member includes a plate defining a compartment. The plate includes two end edges facing each other and having a gap therebetween. Each of the two end edges of the plate includes a recessed portion. The recessed portions of the plate together define the through-hole facing the opening of the transparent housing.

In an example, a spacer ring is mounted between the locking ring and the anti-reverse member.

The present invention will become clearer in light of the following detailed description of illustrative embodiments of this invention described in connection with the drawings.

DETAILED DESCRIPTION OF THE INVENTION

Figure 1:
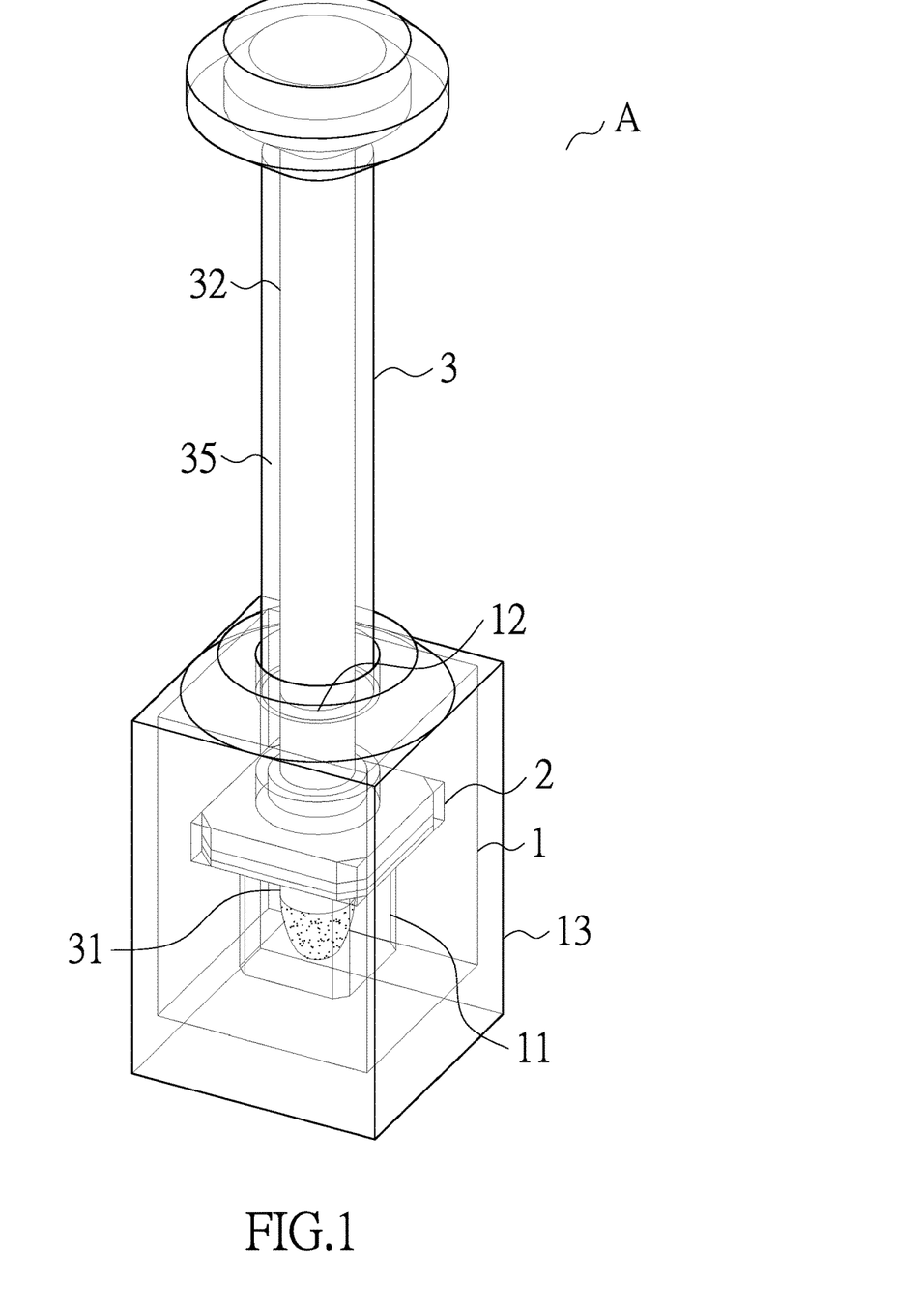
FIG. 1 is a perspective view of an anti-reverse sealing lock of an embodiment according to the present invention.
Figure 2:
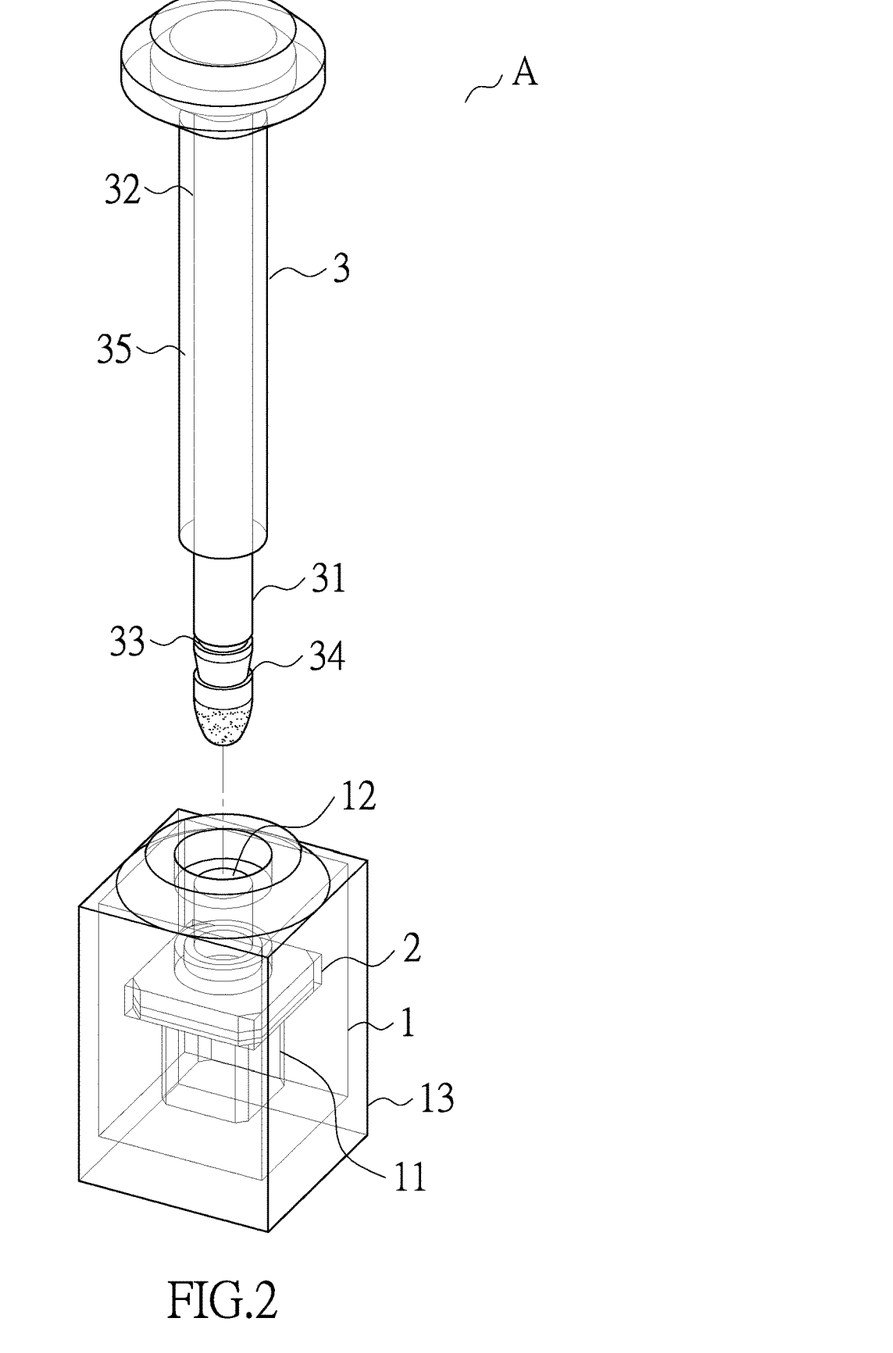
FIG. 2 is an exploded, perspective view of the anti-reverse sealing lock of FIG. 1.
Figure 5:
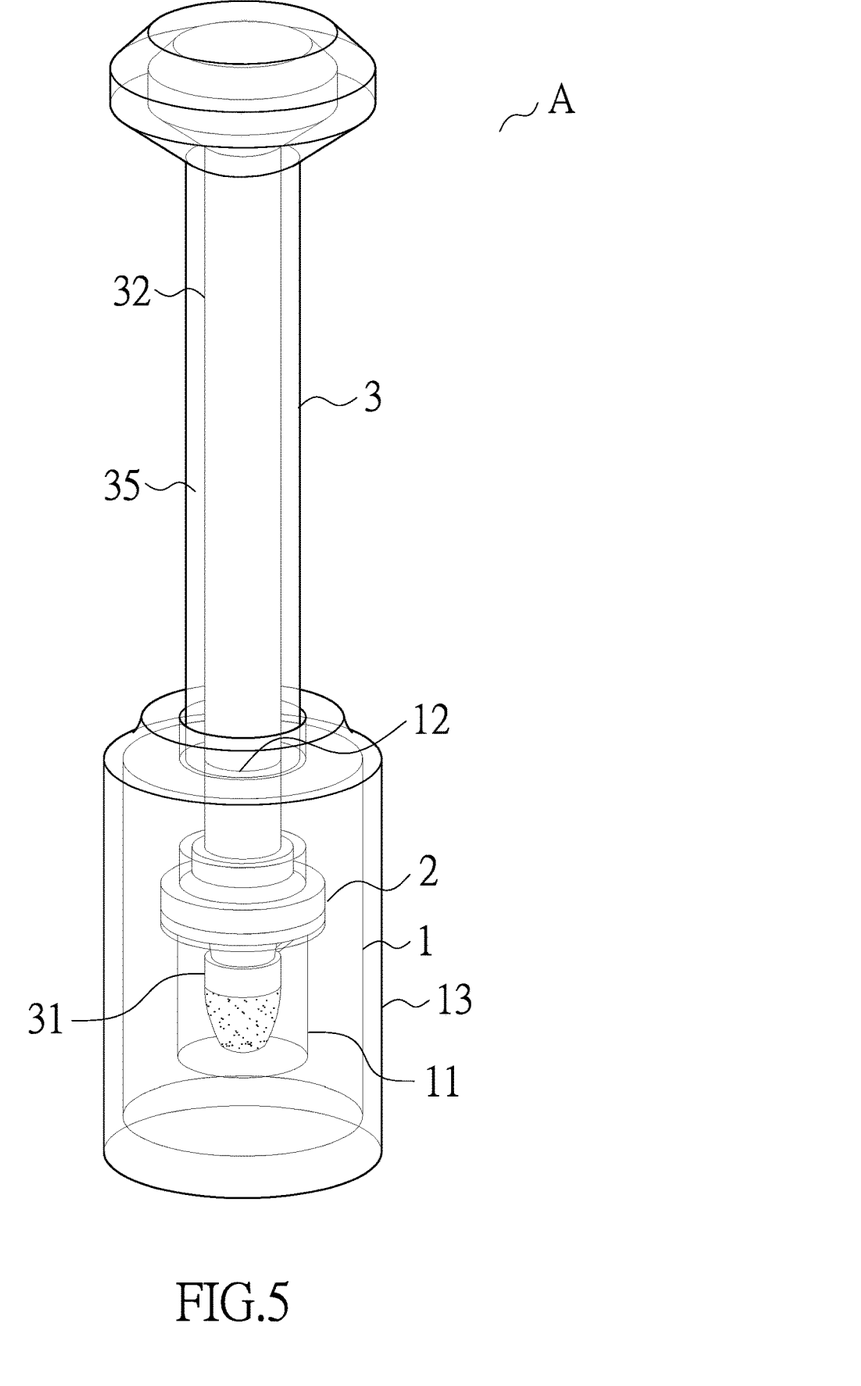
FIG. 5 is a perspective view of an anti-reverse sealing lock of another embodiment according to the present invention.
Figure 6:
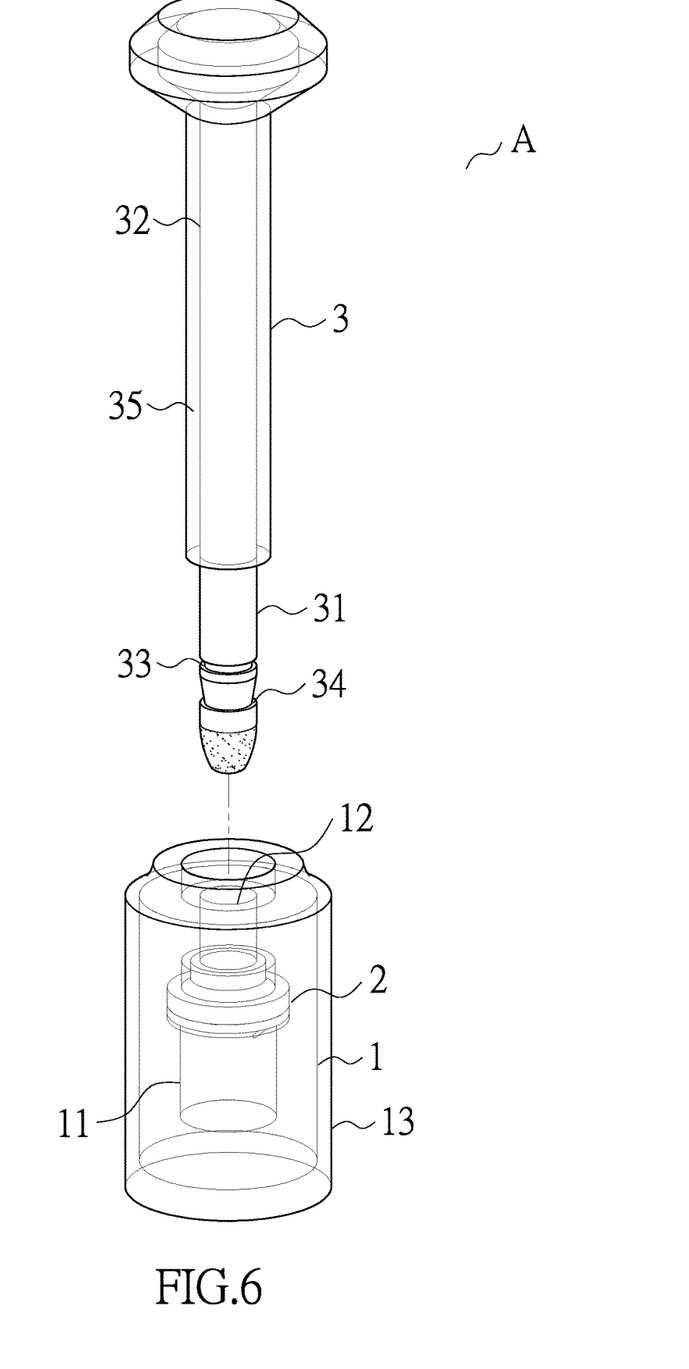
FIG. 6 is an exploded, perspective view of the anti-reverse sealing lock of FIG. 5.
Figure 7:
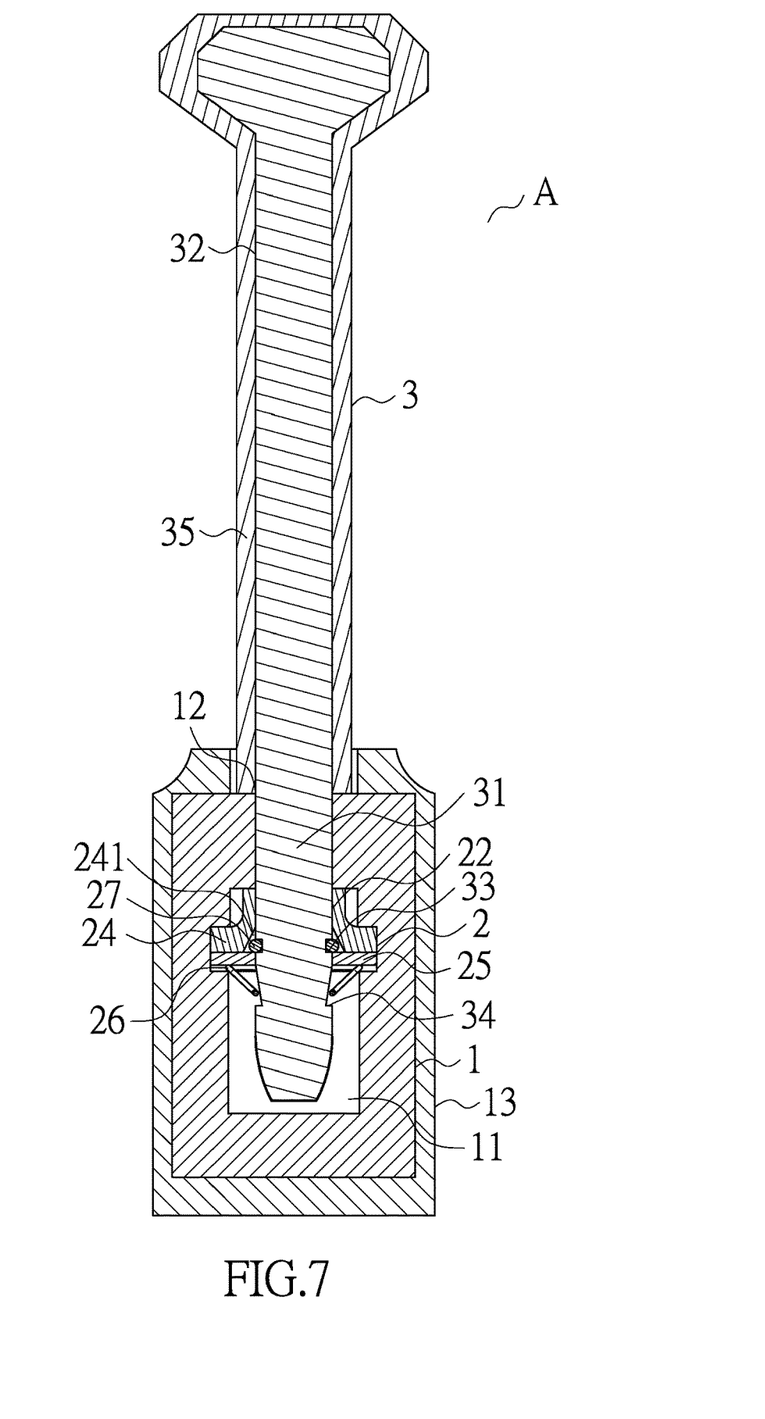
FIG. 7 is a cross sectional view of the anti-reverse sealing lock of FIG. 5.
Figure 9:
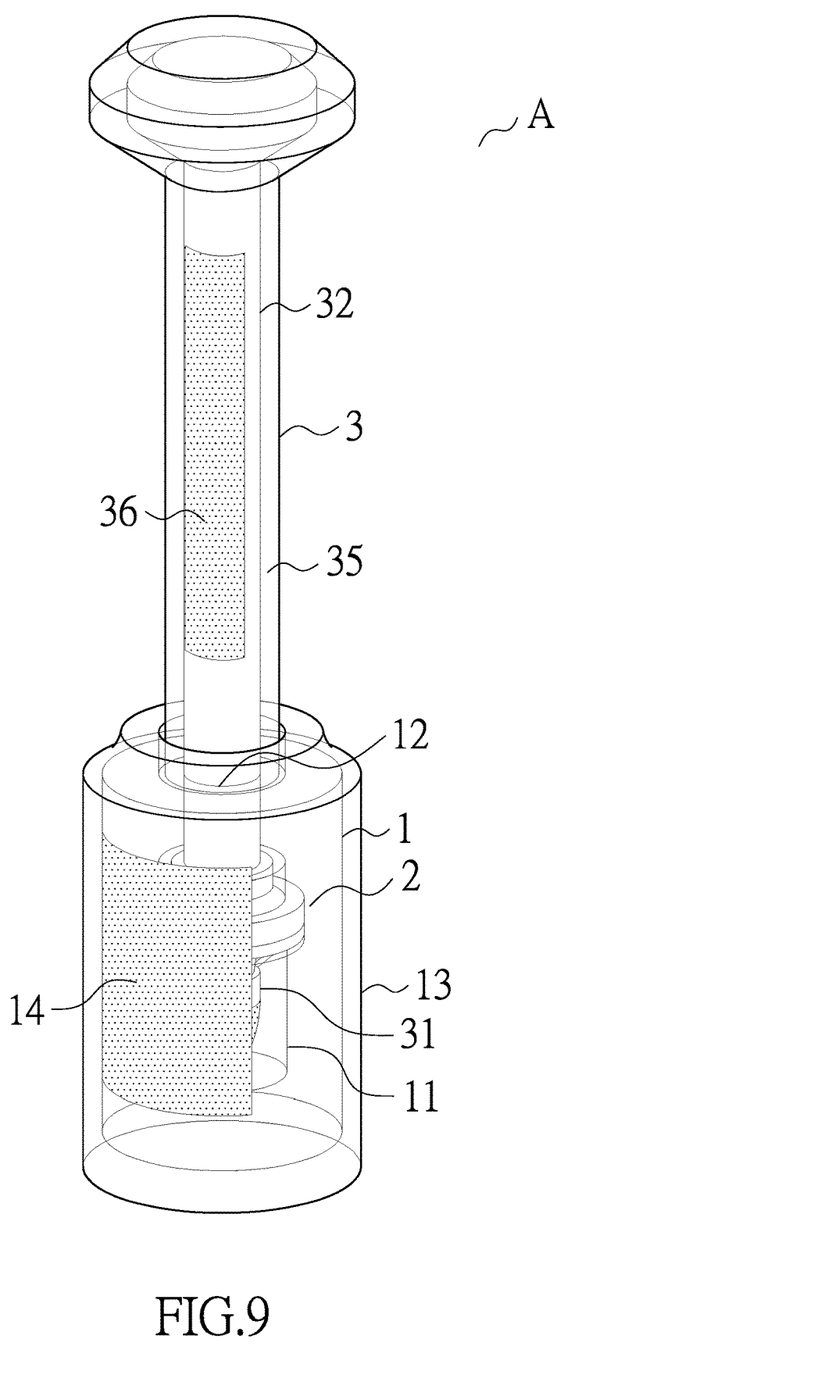
FIG. 9 is a perspective view of an anti-reverse sealing lock of a further embodiment according to the present invention.

With reference to FIGS. 1 and 5, an anti-reverse sealing lock A according to the present invention includes a transparent housing 1 having a top side and a bottom side spaced from the top side along a longitudinal axis. The transparent housing 1 includes a passage 11 therein. The passage 11 has an opening 12 in the top side. The opening 12 has an inner diameter smaller than an inner diameter of the passage 11. The transparent housing 1 can be a hollow cylinder or a hollow parallelepiped according to different needs. Furthermore, a transparent jacket 13 is mounted around the transparent housing 1 to avoid the transparent housing 1 from being destroyed by an external force. Furthermore, a pattern 14 or letters (represented by a simple block in FIG. 9) can be provided on an inner side of the transparent jacket 13 or an outer side of the transparent housing 1. The patterns 14 or letters can be used to provide a notation or to describe precautions, the content of the goods, and the trademark.

Figure 3:
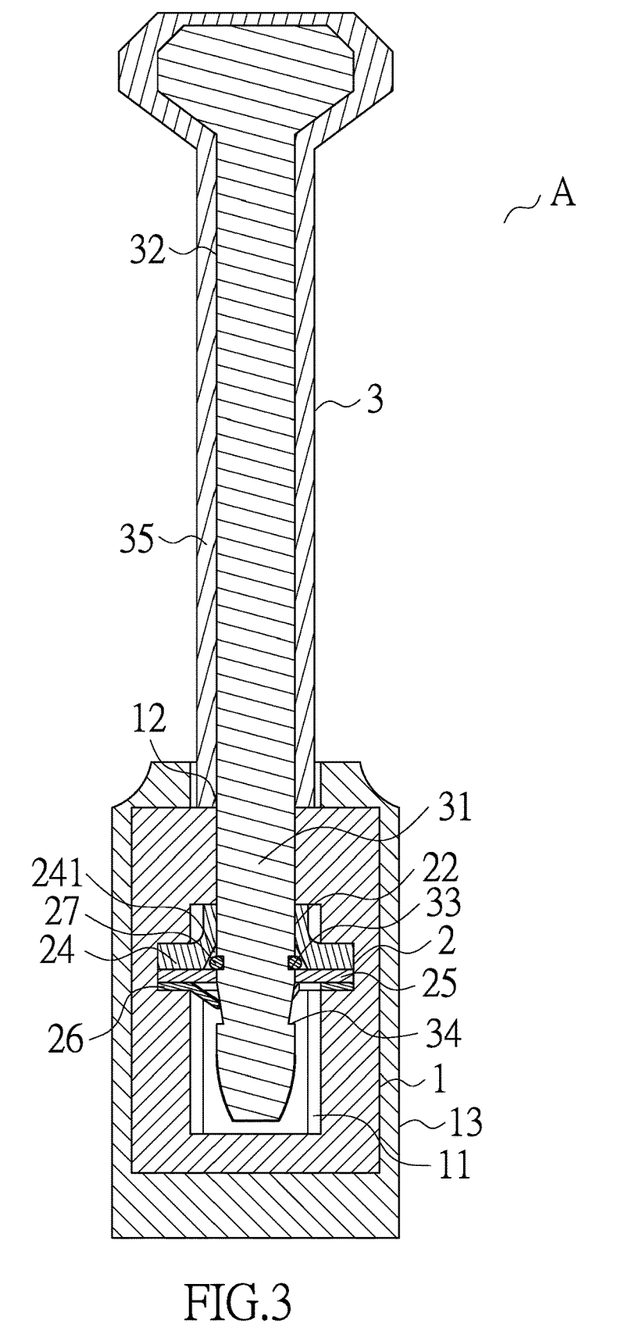
FIG. 3 is a cross sectional view of the anti-reverse sealing lock of FIG. 1.
Figure 13:
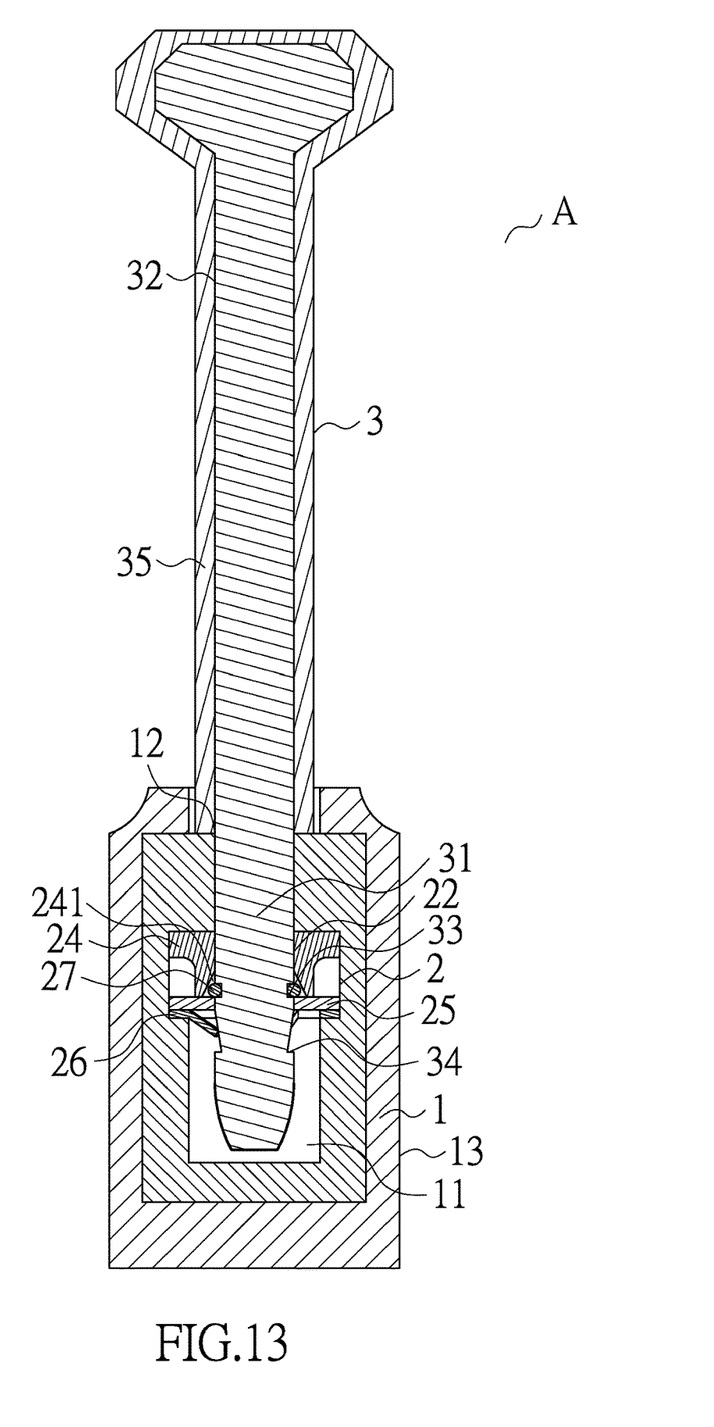
FIG. 13 is a cross sectional view of the anti-reverse sealing lock of yet another embodiment according to the present invention.
Figure 14:
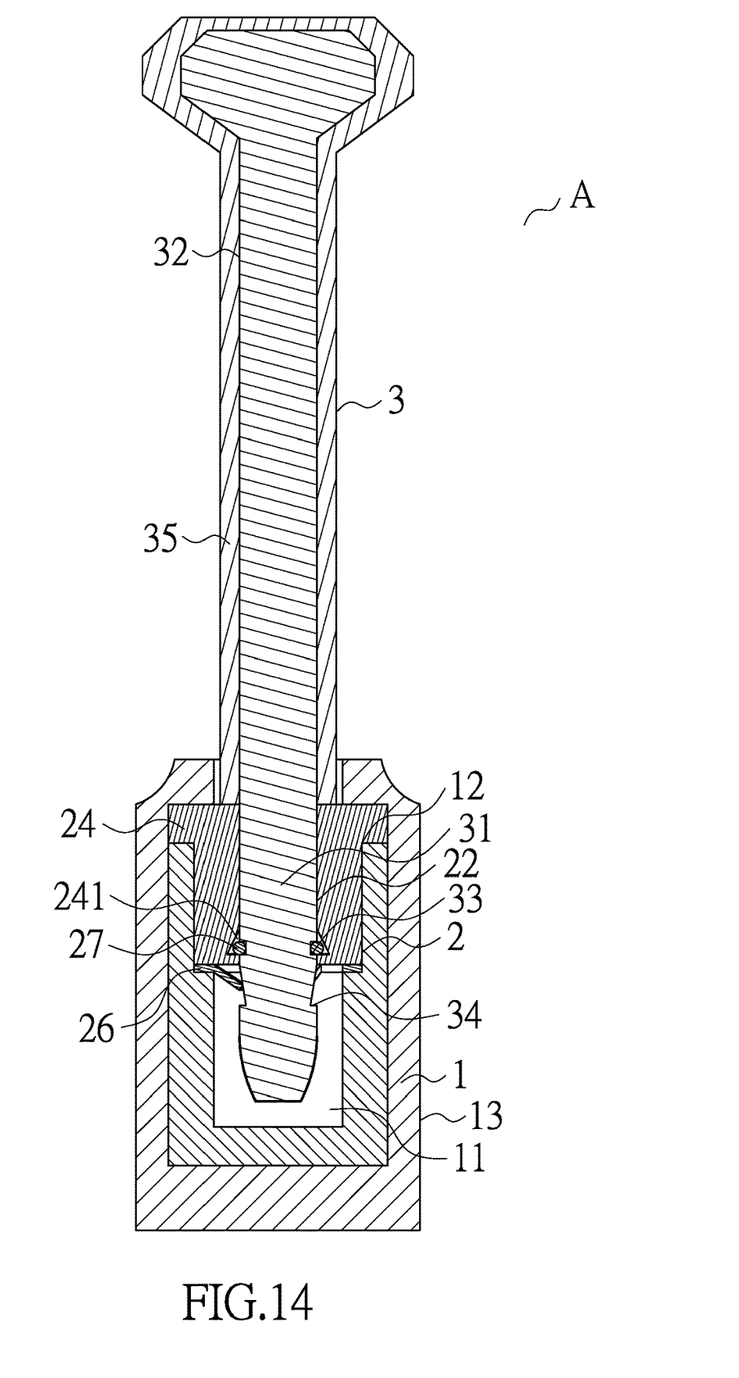
FIG. 14 is a cross sectional view of the anti-reverse sealing lock of still another embodiment according to the present invention.

With reference to FIG. 14 and FIG. 2, or FIG. 7 and FIG. 6, a locking block 2 is mounted in a section of the passage 11. The locking block 2 includes a locking ring 24 and an anti-reverse member 26 mounted in the passage 11. The anti-reverse member 26 is located between the locking ring 24 and the bottom side of the transparent housing 1 along the longitudinal axis. The locking ring 24 includes a locking ring hole 22 having an inclined groove 241 in an end thereof. A C-shaped ring 27 is mounted in the inclined groove 241. The anti-reverse member 26 includes a through-hole 261 facing with the locking ring hole 22. In another embodiment shown in FIG. 13, the orientation of the locking ring 24 is opposite to that shown in FIG. 3. Furthermore, with reference to FIG. 3, a spacer ring 25 is preferably mounted between the locking ring 24 and the anti-reverse member 26.

With reference to FIG. 3 and FIG. 2, or FIG. 7 and FIG. 6, a latch rod 3 includes an insertion section 31 at an end thereof. The remaining portion of the latch rod 3 is an exposed portion 32. The insertion section 31 is insertable into the passage 11 of the transparent housing 1. The insertion section 31 includes a first stepped groove 33 and a second stepped groove 34. The second stepped groove 34 is located between an end face of the insertion section 31 and the first stepped groove 33 along the longitudinal axis. The latch rod 3 extends through the opening 12 of the transparent housing 1, the locking ring hole 22, and the through-hole 261. The C-shaped ring 27 is retained in the first stepped groove 33. The anti-reverse member 26 is located between the first stepped groove 33 and the second stepped groove 34 along the longitudinal axis. A peripheral edge of the through-hole 261 at an end of the anti-reverse member 26 forms an anti-reverse mechanism abutting against an end wall of the second stepped groove 34 when the latch rod 3 moves in a removal direction along the longitudinal axis, preventing removal of the latch rod 3. To avoid destruction of the latch rod 3, a transparent sheath 35 is mounted around the exposed section 32 of the latch rod 3. Furthermore, with reference to FIG. 9, to provide a notation or to describe precautions, the content of the goods, or the trademark on the anti-reversing lock A, a pattern 36 or letters (represented by a single block) can be provided on an inner side of the transparent sheath 35 or an outer side of the exposed section 32 of the latch rod 3.

In use of the anti-reversing sealing lock A, the insertion section 31 is inserted into the passage 11, such that the C-shaped ring 27 forms an anti-reverse mechanism abutting against an end wall of the first stepped groove 33 and such that the anti-reverse member 26 forms another anti-reverse mechanism abutting against an end wall of the second stepped groove 34, preventing removal of the latch rod 3 and thereby achieving the sealing purposes. Furthermore, in comparison with the prior art using two C-shaped rings performing the anti-reverse mechanisms respectively abutting against associated stepped grooves, one of the C-shaped rings is substituted by the anti-reverse member 26 in the present invention. The substitution is advantageous in that even someone intends to destroy the anti-reverse sealing lock A, the anti-reverse member 26 is less easily to be destroyed as a C-shaped ring that can be easily destroyed (into fragments by an external force or by cutting) and then removed.

Figure 10:
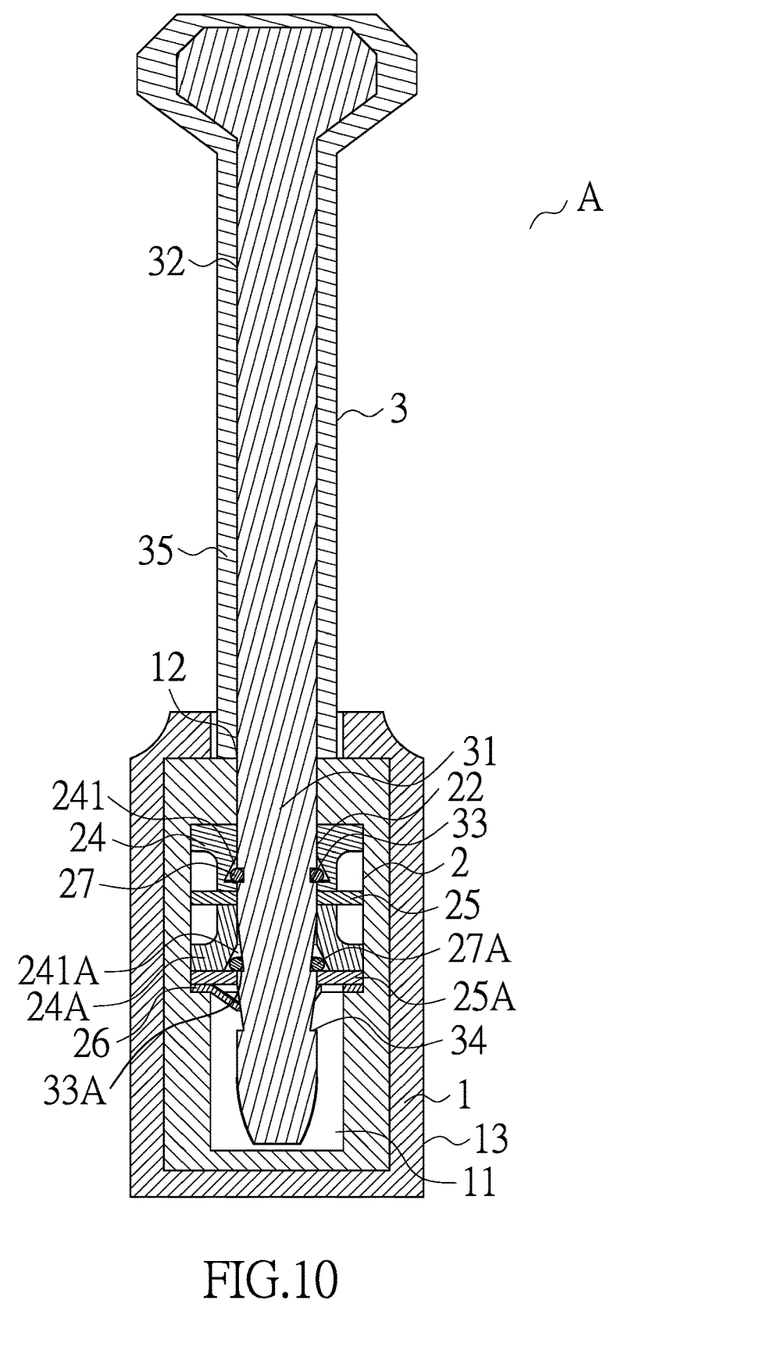
FIG. 10 is a cross sectional view of an anti-reverse sealing lock of a further embodiment according to the present invention.

Furthermore, the number of the locking ring 24 and the spacer ring 25 is not limited in the present invention. Namely, two or more locking rings 24 and spacer rings 25 can be used. In an embodiment shown in FIG. 10, another locking ring 24A similar to the locking ring 24 and another spacer ring 25A similar to the spacer ring 25A can be disposed between the spacer ring 25 and the anti-reverse member 26. Similarly, the another locking ring 24A includes a locking ring hole having an inclined groove 241A in an end thereof. Another C-shaped ring 27A similar to the C-shaped ring 27 is mounted in the inclined groove 241A. Furthermore, another stepped groove 33A similar to the first stepped groove 33 is disposed between the first stepped groove 33 and the second stepped groove 34. After the latch rod 3 is inserted into the locking block 2, the another C-shaped ring 27A forms an anti-reverse mechanism to retain the stepped groove 33A in place.

Figure 4:
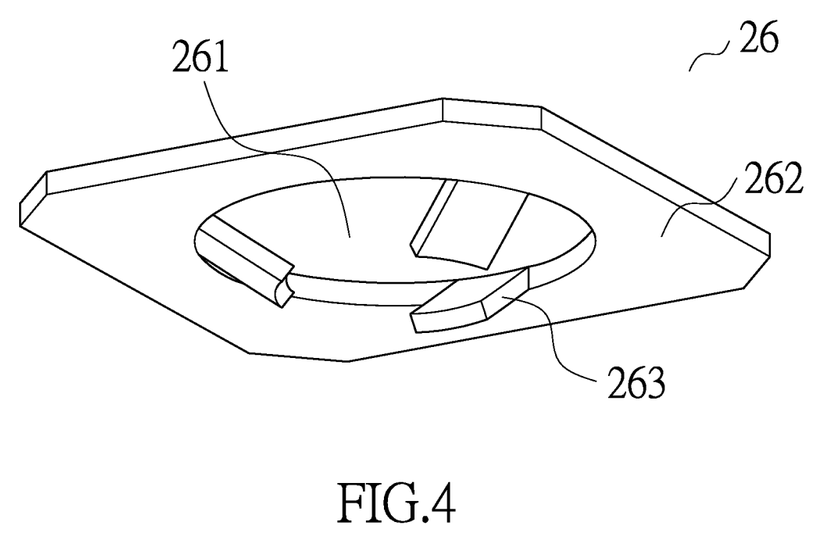
FIG. 4 is a perspective view of an anti-reverse member of the anti-reverse sealing lock of FIG. 1.

In an embodiment shown in FIG. 4, the anti-reverse member 26 includes an annular plate 262 defining the through-hole 261. A plurality of flexible anti-reverse plates 263 extends from an inner periphery of the through-hole 261 and is spaced from each other in a circumferential direction about the longitudinal axis. Since the anti-reverse plates 263 are flexible, when the insertion section 31 moves through the annular plate 262 in the removal direction, each of the anti-reversing plates 263 flexes and abuts against the end wall of the second stepped groove 34, forming an anti-reverse mechanism preventing removal of the latch rod 3 in the removal direction.

Figure 8:
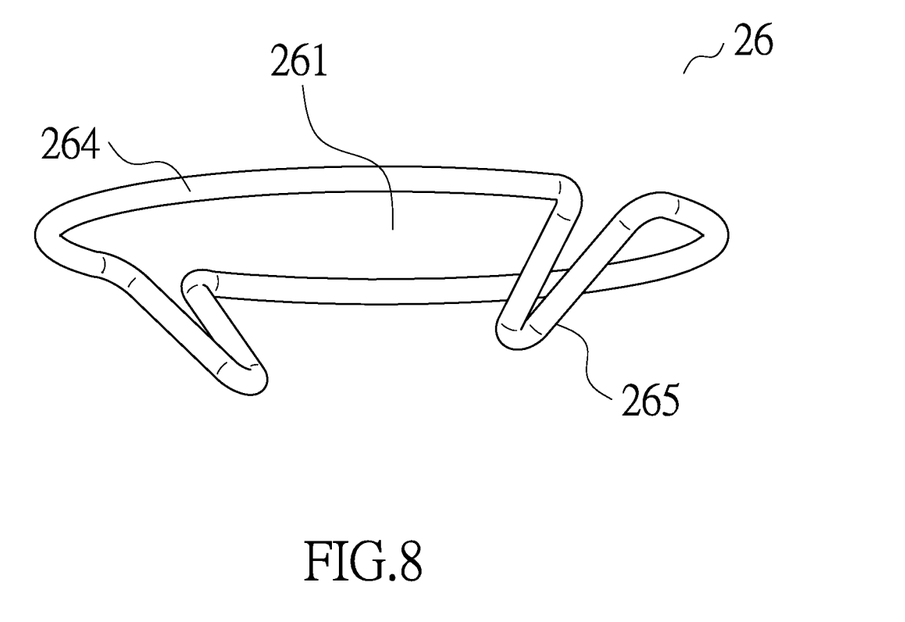
FIG. 8 is a perspective view of an anti-reverse member of the anti-reverse sealing lock of FIG. 5.

In another embodiment shown in FIG. 8, the anti-reverse member 26 includes a frame 264 defining the through-hole 261. A plurality of protrusions 265 protrudes downward from a bottom side of the frame 264, is spaced from each other in the circumferential direction about the longitudinal axis, and forms the anti-reverse mechanism for abutting against the end wall of the second stepped groove 34, preventing removal of the latch rod 3 in the removal direction.

Figure 11:
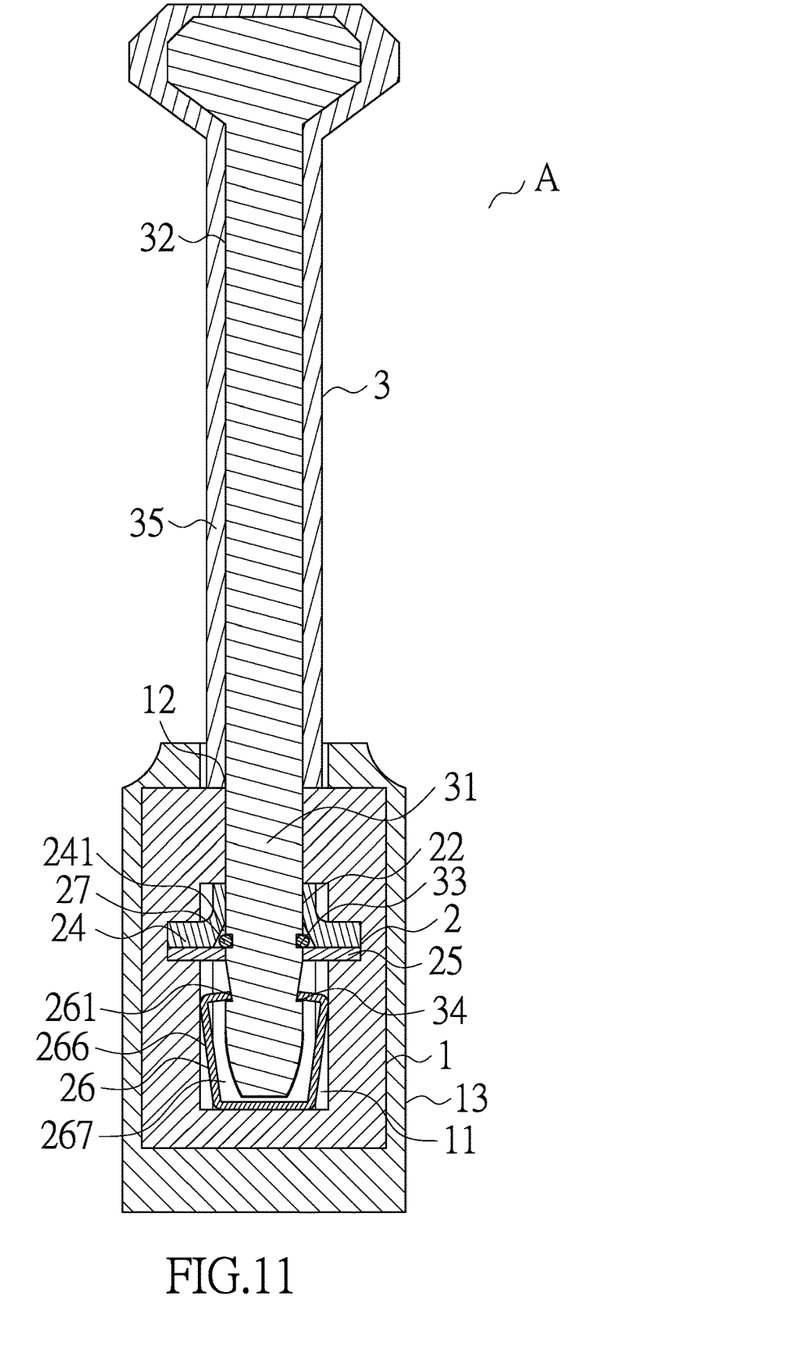
FIG. 11 is a cross sectional view of an anti-reverse sealing lock of still another embodiment according to the present invention.
Figure 12:
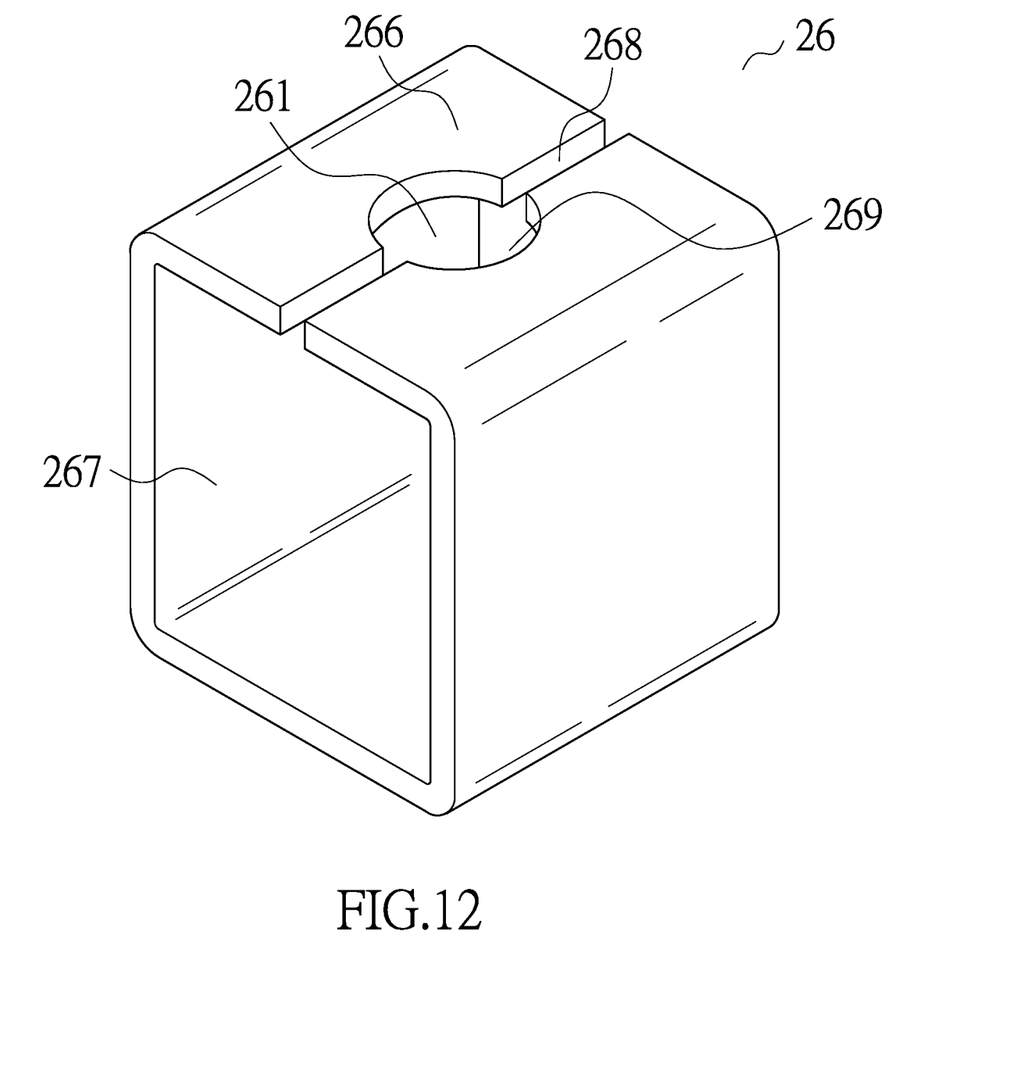
FIG. 12 is a perspective view of an anti-reverse member used in the anti-reverse sealing lock of FIG. 11.

In a further embodiment shown in FIG. 11 and FIG. 12, the anti-reverse member 26 includes a plate 266 defining a compartment 267. The plate 266 includes two end edges facing each other and having a gap 268 therebetween. Each of the two end edges of the plate 266 includes a recessed portion 269. The recessed portions 269 of the plate 266 together define the through-hole 261 facing the opening 12 of the transparent housing 1. Therefore, when the insertion section 31 extends through the through-hole 261 in the removal direction, the through-hole 261 is widens due to provision of the gap 268. A peripheral edge of the through-hole 261 at an end of the anti-reverse member 26 clamps an outer periphery of the insertion section 31 and forms an anti-reverse mechanism abutting against an end wall of the second stepped groove 34 when the latch rod 3 moves in the removal direction along the longitudinal axis, preventing removal of the latch rod 3.

Although specific embodiments have been illustrated and described, numerous modifications and variations are still possible without departing from the scope of the invention. The scope of the invention is limited by the accompanying claims.

What is claimed is:

1. An anti-reverse sealing lock comprising:
   a transparent housing including a top side and a bottom side spaced from the top side along a longitudinal axis, wherein the transparent housing includes a passage therein, wherein the passage has an opening in the top side, wherein the opening has an inner diameter smaller than an inner diameter of the passage;
   a locking block mounted in a section of the passage, wherein the locking block includes a locking ring and an anti-reverse member mounted in the passage, wherein the anti-reverse member is located between the locking ring and the bottom side of the transparent housing along the longitudinal axis, wherein the locking ring includes a locking ring hole having an inclined groove in an end thereof, wherein a C-shaped ring is mounted in the inclined groove, and wherein the anti-reverse member includes a through-hole facing the locking ring hole; and
   a latch rod including an insertion section at an end thereof, wherein a remaining portion of the latch rod defines an exposed section, wherein the insertion section is insertable into the passage of the transparent housing, wherein the insertion section includes a first stepped groove and a second stepped groove, wherein the second stepped groove is located between an end face of the insertion section and the first stepped groove along the longitudinal axis, wherein the latch rod extends through the opening of the transparent housing, the locking ring hole, and the through-hole, wherein the C-shaped ring is retained in the first stepped groove, wherein the anti-reverse member is located between the first stepped groove and the second stepped groove along the longitudinal axis, wherein the anti-reverse member terminates at a peripheral edge about the through-hole to form an anti-reverse mechanism abutting against an end wall of the second stepped groove when the latch rod moves in a removal direction along the longitudinal axis, preventing removal of the latch rod; wherein both the C-shaped ring and anti-reverse member substantially surround the insertion section circumferentially for retentive engagement thereof.

2. The anti-reverse sealing lock as claimed in claim 1, further comprising a transparent sheath mounted around the exposed section of the latch rod.

3. The anti-reverse sealing lock as claimed in claim 2, further comprising a pattern or letters provided on an inner side of the transparent sheath or an outer side of the exposed section of the latch rod.

4. The anti-reverse sealing lock as claimed in claim 1, further comprising a transparent jacket mounted around the transparent housing.

5. The anti-reverse sealing lock as claimed in claim 4, further comprising a pattern or letters provided on an inner side of the transparent jacket or an outer side of the transparent housing.

6. The anti-reverse sealing lock as claimed in claim 1, wherein the transparent housing is a hollow cylinder or a hollow parallelepiped.

7. The anti-reverse sealing lock as claimed in claim 1, wherein the anti-reverse member includes an annular plate defining the through-hole, and wherein a plurality of flexible anti-reverse plates extends from an inner periphery of the through-hole and is spaced from each other in a circumferential direction about the longitudinal axis.

8. The anti-reverse sealing lock as claimed in claim 1, wherein the anti-reverse member includes a frame defining the through-hole and having a bottom side, and wherein a plurality of protrusions protrudes downward from the bottom side of the frame, is spaced from each other in a circumferential direction about the longitudinal axis, and forms the anti-reverse mechanism for abutting against the end wall of the second stepped groove.

9. The anti-reverse sealing lock as claimed in claim 1, wherein the anti-reverse member includes a plate defining a compartment, wherein the plate includes two end edges facing each other and having a gap therebetween, wherein each of the two end edges of the plate includes a recessed portion, and wherein the recessed portions of the plate together define the through-hole facing the opening of the transparent housing.

10. The anti-reverse sealing lock as claimed in claim 1, further comprising a spacer ring mounted between the locking ring and the anti-reverse member.

11. The anti-reverse sealing lock as claimed in claim 1, wherein the latch rod is concentrically disposed in annular engagement with each of the.

\* \* \* \* \*